(12) United States Patent
Wang et al.

(10) Patent No.: US 8,519,298 B2
(45) Date of Patent: Aug. 27, 2013

(54) SPLIT LASER SCRIBE

(75) Inventors: Jianmin Wang, Camarillo, CA (US);
Craig Metzner, Simi Valley, CA (US);
Gregory W. Schuh, Camarillo, CA (US)

(73) Assignee: Veeco Instruments, Inc., Plainview, NY (US)

( * ) Notice: Subject to any disclaimer, the term of this patent is extended or adjusted under 35 U.S.C. 154(b) by 577 days.

(21) Appl. No.: 12/731,798

(22) Filed: Mar. 25, 2010

(65) Prior Publication Data

US 2011/0233176 A1   Sep. 29, 2011

(51) Int. Cl.
*B23K 26/00* (2006.01)
*B23K 26/14* (2006.01)
*B23K 26/02* (2006.01)

(52) U.S. Cl.
USPC ............ 219/121.6; 219/121.61; 219/121.67; 219/121.68; 219/121.69; 219/121.78

(58) Field of Classification Search
USPC ............ 219/121.6, 121.61, 121.62, 121.67, 219/121.68, 121.69, 121.7, 121.78, 121.79, 219/121.82, 121.85; 438/463
See application file for complete search history.

(56) References Cited

U.S. PATENT DOCUMENTS

| | | | |
|---|---|---|---|
| 4,659,185 A | 4/1987 | Aughton | |
| 6,420,245 B1 | 7/2002 | Manor | |
| 6,555,447 B2 | 4/2003 | Weishauss et al. | |
| 6,562,698 B2 | 5/2003 | Manor | |
| 6,580,054 B1 | 6/2003 | Liu et al. | |
| 6,888,167 B2 * | 5/2005 | Slater et al. | 257/81 |
| 6,915,795 B2 | 7/2005 | Brouillette et al. | |
| 6,960,739 B2 | 11/2005 | Liu et al. | |
| 6,992,026 B2 | 1/2006 | Fukuyo et al. | |
| 7,397,553 B1 * | 7/2008 | Mehanian et al. | 356/237.2 |
| 7,611,966 B2 | 11/2009 | Li et al. | |
| 8,068,263 B2 * | 11/2011 | Szarvas et al. | 359/10 |
| 2003/0190770 A1 | 10/2003 | Yeom et al. | |
| 2005/0263854 A1 | 12/2005 | Shelton et al. | |
| 2005/0279740 A1 | 12/2005 | Liu et al. | |
| 2006/0138097 A1 * | 6/2006 | Hiramatsu | 219/121.7 |
| 2006/0261050 A1 | 11/2006 | Krishnan et al. | |
| 2007/0248126 A1 | 10/2007 | Liu et al. | |
| 2008/0029152 A1 | 2/2008 | Mislshtein et al. | |
| 2008/0088898 A1 * | 4/2008 | Szarvas et al. | 359/24 |
| 2008/0290078 A1 * | 11/2008 | Nomaru et al. | 219/121.67 |

OTHER PUBLICATIONS

Albalak, Ramon J., "Laser Singulation and Scribing Technologies as Alternatives to Conventional Mechanical Dicing," Advanced Dicing Technologies, Ltd., Haifa, Israel, www/adt-co.com, Oct. 2005 issue of "Chip Scale Review" magazine.
International Searching Authority, United States of America, Written Opinion, PCT/US2010/052047, dated Nov. 26, 2010, 6 pages.
International Searching Authority, United States of America, International Search Report, PCT/US2010/052047, dated Nov. 26, 2010, 2 pages.

* cited by examiner

*Primary Examiner* — Hsien Ming Lee
(74) *Attorney, Agent, or Firm* — HolzerIPLaw, PC

(57) ABSTRACT

A dual-beam laser cutting system uses laser beam polarization to output two identical laser beams. The dual identical laser beams are spaced appropriately to simultaneously cut a wafer thus increasing the laser cutting system's throughput as compared to a single-laser cutting system. In one implementation, the dual-beam laser cutting system 100 utilizes a beam expander 220, two half-wave plates 224, 238, a polarizing beam splitter 228, a mirror 236, and two lenses 234, 242 to provide two identical laser beams 202, 204 from a single laser source 214. The identical laser beams 202, 204 are tuned to have the same power, cross-sectional diameter, and polarization direction. One of the half-wave plates 224 is rotated to yield laser beams with the same power. The other half-wave plate 238 is rotated to yield laser beams with the same polarization direction.

35 Claims, 4 Drawing Sheets

SPLIT LASER SCRIBE

BACKGROUND

Die separation, or singulation, by sawing is the process of cutting a microelectronic wafer or substrate into its individual circuit die with a mechanical rotating abrasive saw blade. As smaller and smaller microelectronic components are desired, wafer size is increased and thickness is reduced. As a result, the wafer becomes more fragile. Vibrations of the rotating abrasive saw blade are transmitted to the wafer and may cause significant chipping and/or micro-cracking in the wafer. Further, the vibrations can result in unacceptable cut quality and poor die-edge fracture strength. Additionally, higher performance, but more fragile wafer materials are increasingly used which also makes significant chipping and/or micro-cracking to the wafer more likely. The rotating abrasive saw blade is also susceptible to wear and blade clogging, which reduces the quality of die singulation over time.

Further, increasingly expensive materials are used for wafers. To reduce cost, increased die density on the wafer is desired. One effective way to achieve increased die density is to reduce street width or kerf of cut of the abrasive saw blade. However, reduction of blade width is limited by blade physical strength and useable life of the saw blade. Further, using very thin blades requires high rotation speeds to avoid undue vibration and frequent blade changes.

Singulation of a wafer using a laser rather than a mechanical saw is advantageous in many ways. For example, the laser does not transmit any mechanical stress to the wafer during cutting which reduces the likelihood of chipping and/or micro-cracking the wafer. Further, laser singulation is not susceptible to wear and blade clogging and has no consumable parts (i.e., saw blades). Still further, higher throughput and thinner, more accurate, singulation may be accomplished using a laser versus a mechanical saw.

However, the cost of ownership of a laser cutting system is substantially higher than that of a mechanical cutting system. As such, in many applications the aforementioned advantages of a laser cutting system do not outweigh the higher cost of ownership of the laser cutting system. To increase the attractiveness of a laser cutting system, the cost of ownership of a laser cutting system needs to be reduced.

SUMMARY

Implementations described and claimed herein address the foregoing problems by providing a dual-beam laser cutting system using laser beam polarization to output two identical laser beams. The dual laser beams are spaced appropriately to simultaneously cut a wafer thus increasing the dual-beam laser cutting system's throughput as compared to a single-beam laser cutting system. Higher throughput yields a lower total cost of ownership of the dual-beam laser cutting system versus the single-beam laser cutting system. This lower total cost of ownership may be sufficient to make the dual-beam laser cutting system an economically viable option for applications that would typically use a mechanical cutting system.

The dual-beam laser cutting system utilizes at least two half-wave plates and a polarizing beam splitter (e.g., a polarizing cube beam splitter (PCBS)) to provide two identical laser beams from a single laser source. The identical laser beams are tuned to have the same power, cross-sectional diameter, and polarization direction. Further, the dual laser beams are positioned in very close proximity to allow simultaneous cutting of the wafer.

Other implementations are also described and recited herein.

BRIEF DESCRIPTIONS OF THE DRAWINGS

DETAILED DESCRIPTIONS

A typical method of splitting a high-power laser beam utilizes a beam splitter with a fixed splitting ratio. However, the ratio of the beam splitter must be very accurate to produce two identical laser beams. In practice, the achievable controlled ratio for a beam splitter is about 5% with a commercially acceptable price. As a result, an intensity attenuator is added to the stronger of the two laser beams to achieve identical beam intensities of the two laser beams. The intensity attenuator adjusts the intensity of the stronger of the two laser beams down to equal the weaker of the two laser beams. As such, a significant portion of the laser power is lost in order to achieve identical laser beams. This method of splitting a high-power laser beam does not utilize laser beam polarization.

A method of splitting a high-power laser beam according to the presently disclosed technology manipulates laser beam polarization to output two identical laser beams. Since an intensity attenuator is not required in the presently disclosed technology, overall power loss is reduced as compared to the aforementioned typical method of splitting a high-power laser beam. Identical laser beams as referred to herein means that the power, cross-sectional diameter, and polarization direction of the laser beams differs by 0.5%, at most.

Figure 1:
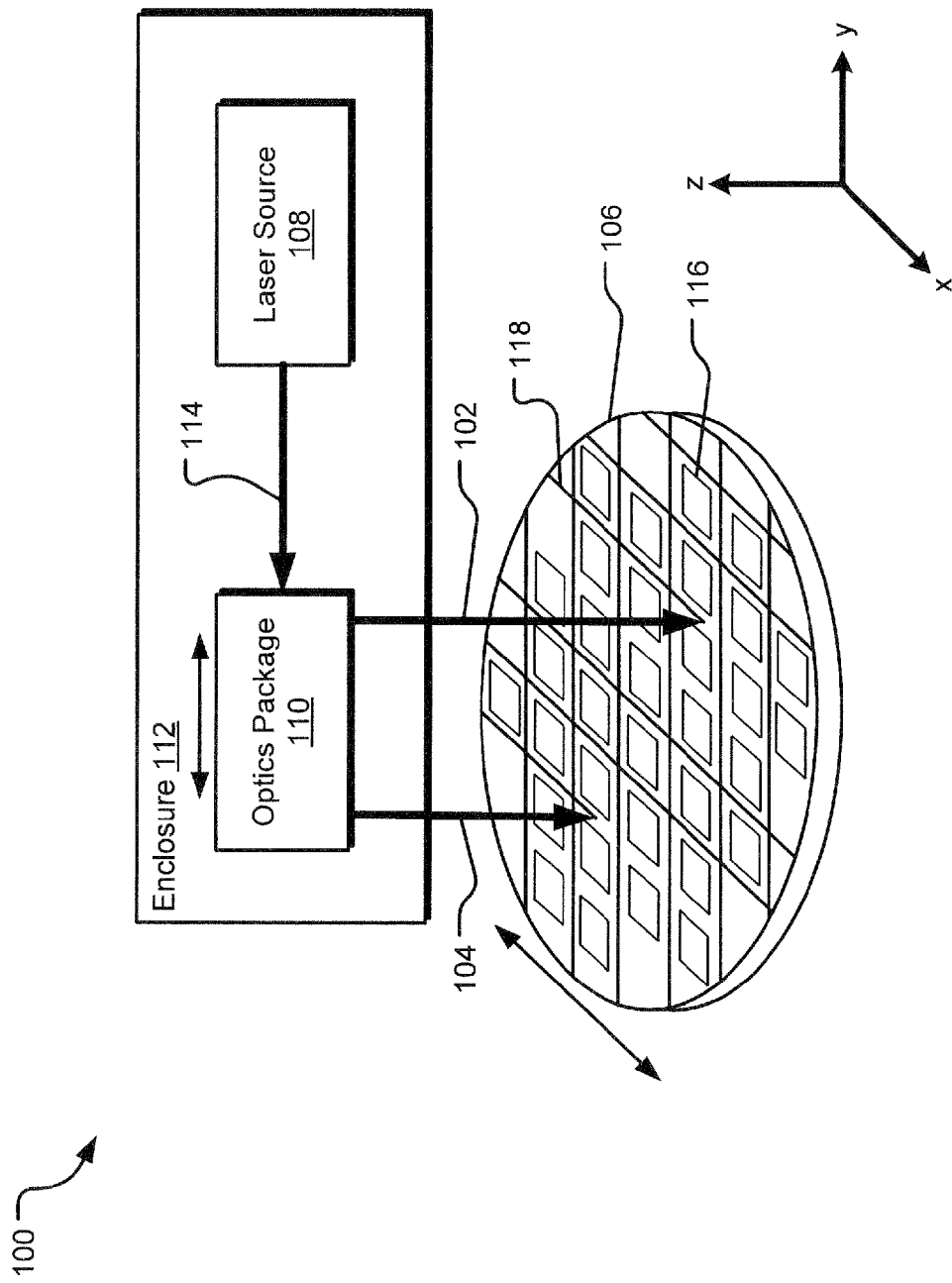
FIG. 1 illustrates an example split laser scribe directing two identical laser beams to a substrate.

FIG. 1 illustrates an example split laser scribe 100 directing two identical laser beams 102, 104 to a substrate 106. The split laser scribe 100 includes both a laser source 108 and an optics package 110 mounted within an enclosure 112. The laser source 108 outputs electromagnetic radiation of any frequency or frequencies (e.g., visible, infrared, or ultraviolet) in a spatially coherent, narrow low-divergence, linearly polarized beam 114. Further, the beam 114 may be a continuous wave output or a pulsed output from the laser source 108. Still further, the laser source 108 may utilize any gain media (e.g., gas, liquid, solid, or plasma) to amplify the beam 114. Further yet, the laser source 108 may be of any type (e.g., gas, chemical, dye, metal vapor, solid-state, or semiconductor). The beam 114 is relatively high-power (e.g., class III/a, Mb, or IV) in order to perform various die cutting and/or singulation processes (discussed in detail below). In one implementation, the laser source 108 produces a beam 114 with wavelength of 355 nm, using between 5 µJ and 15 µJ of energy. In another implementation, the laser source 108 produces a beam 114 using 10 µJ of energy. In yet another implementation, the laser source 108 produces a beam 114 with a wavelength ranging from 200 nm to 600 nm. In still another implementation, the laser source 108 is a diode-pumped solid-state laser (e.g., a neodymium-doped-YAG crystal with a laser diode).

The beam 114 is input into the optics package 110, which manipulates laser beam polarization to output the two identical laser beams 102, 104. The optics package 110 includes at least two half-wave plates that manipulate beam polarization direction and a polarizing beam splitter (discussed in more detail with regard to FIG. 2) that splits beam 114 into the two identical laser beams 102, 104 and outputs the laser beams 102, 104 to the substrate 106.

In order to take maximum advantage of both of the laser beams 102, 104 on one substrate 106, a span between the laser beams 102, 104 may be equal or less than half of the diameter of the substrate 106. For example, if the substrate 106 is approximately 48 mm in diameter, the laser beams 102, 104 are separated by at most approximately 24 mm. In other implementations, the optics package 110 outputs three or more identical laser beams. Further, multiple substrates may be utilized simultaneously as well.

The enclosure 112 is a mounting structure that serves to secure the laser source 108 and the optics package 110 and maintain alignment between the laser source 108, optics package 110, and substrate 106. The enclosure 112 may further serve to provide a desired operating environment for the laser source 108 and the optics package 110. For example, the enclosure 112 may maintain a desired value or range for temperature, humidity, and/or pressure. The enclosure 112 may also provide a desired atmosphere (e.g., a vacuum or specific balance of gasses). Further, the enclosure 112 may prevent contaminants from contacting the laser source 108 and the optics package 110 and/or prevent extraneous laser radiation from exiting the enclosure 112.

The substrate 106, or wafer, is a thin slice of a semiconductor material (e.g., silicon, sapphire, or germanium). The substrate 106 serves as a mounting point for microelectronic devices built in and over the substrate 106. In one implementation, the substrate 106 is specifically adapted to accept a series of thin-films (or epitaxial layers) that constitute one or more microelectronic devices. Further, the substrate 106 may be specifically adapted for light-emitting diode (LED) applications. The substrate 106 is circular, however other substrate shapes may be used (e.g., square). In one implementation, the substrate 106 has a diameter that ranges from 25.4 mm (1 inch) to 450 mm (18 inch) and a thickness that ranges from 100 µm to 925 µm. However, the presently disclosed technology is equally applicable to other sizes of substrates. The substrate 106 is divided into an array of die pieces (e.g., die 116). In some implementations, there may be multiple substrates mounted on a plane.

The laser beams 102, 104 separate the substrate 106 into individual die pieces. In one implementation, the laser beams 102, 104 ablate a trench (e.g., trench 118) in the substrate 106. The substrate 106 is then broken along the trench lines by expanding a tape attached to the substrate 106 or otherwise mechanically propagating cracks through the substrate 106 along the trench lines. In another implementation, the laser beams 102, 104 are alone powerful enough to separate the individual die pieces.

The substrate 106 is mounted on a carrier (not shown) that moves the substrate 106 in the x-direction and rotates the substrate 106 about the z-axis. Further, the optics package 110 moves in the y-direction. In one implementation, the optics package 110 moves independently of the laser source 108 and enclosure 112. In other implementations, the optics package 110 moves with the laser source 108 and/or enclosure 112.

During operation, the laser beams 102, 104 each make a first trench on the substrate 106 by moving the substrate 106 in the x-direction such that each of the laser beams 102, 104 move across the entirety of the substrate 106 in the x-direction between two rows of dice. The optics package 110 then advances in the y-direction and the laser beams 102, 104 move across the entirety of the substrate 106 in the x-direction again to separate the next two rows of dice. This process repeats until trenches in the x-direction between all the rows of dice are made.

The substrate 106 then rotates generally 90 degrees about the z-axis to re-orient the rows of dice that were previously in the y-direction in the x-direction. Each of the laser beams 102, 104 again move across the entirety of the substrate 106 in the x-direction between two rows of dice and the optics package 110 periodically advances in the y-direction. This process repeats until trenches between all the rows of dice in the x-direction are made. As a result, trenches are made between all dice on the substrate 106 and the individual dice may be separated from one another. For example, the implementation of FIG. 1 shows that the laser beams 102, 104 have each made two complete trenches and one partial trench in the x-direction. Trenches in the y-direction are shown between all the rows of dice in the y-direction.

Figure 2:
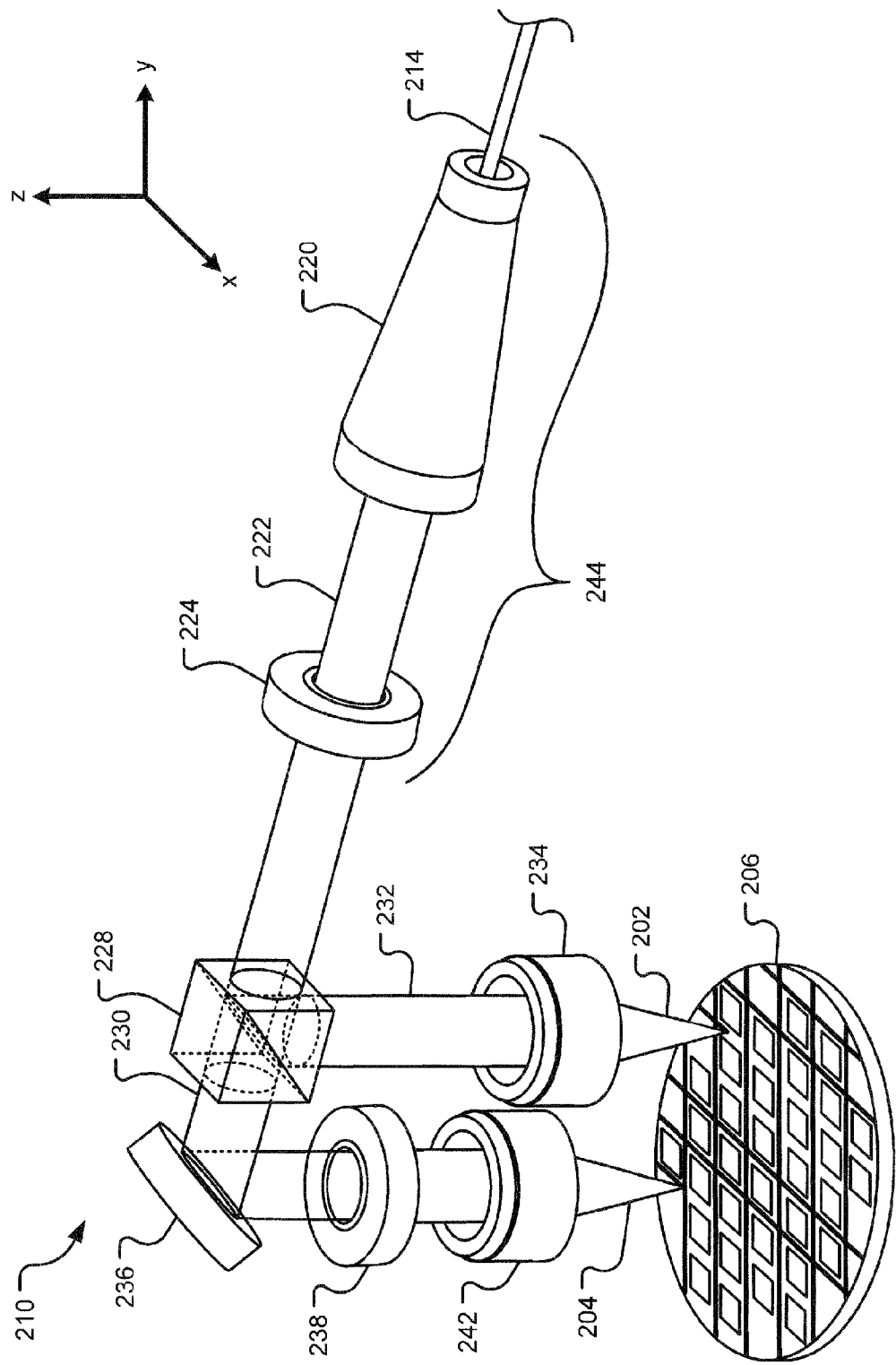
FIG. 2 illustrates an example optics package for a split laser scribe directing two identical laser beams to a substrate.

FIG. 2 illustrates an example optics package 210 for a split laser scribe directing two identical laser beams 202, 204 to a substrate 206. A laser beam 214 output from a laser source (not shown) enters the optics package 210. Intensity, polarization direction, wavelength, and size of the linearly polarized beam 214 may vary widely. In one implementation, a wavelength of the beam 214 is within a range of 266 nm to 1064 nm and a diameter of the beam 214 is within a range of 3 mm to 4 mm. In another implementation, the wavelength of the beam 214 is 266 nm or 355 nm.

The laser beam 214 enters a beam expander 220, which expands the diameter of the laser beam 214 and outputs an expanded laser beam 222. In one implementation, the beam expander 220 is a 3-5× beam expander. For example, if laser beam 214 has a 3 mm diameter and the beam expander 220 is a 5× beam expander, the expanded laser beam 222 has a diameter of 15 mm. The laser beam 214 is expanded in order to obtain a final focused laser beam with a sufficiently small diameter.

The expanded laser beam 222 passes through a half-wave plate 224. The half-wave plate 224 alters the polarization state of the expanded laser beam 222 by shifting the phase between two perpendicular polarization components of the expanded laser beam 222. More specifically, the half-wave plate 224 retards one polarization component by half a wavelength or 180 degrees. As a result, the overall polarization direction of the expanded laser beam 222 is altered. In one implementation, the beam expander 220 and the half-wave plate 224 are components of a expander/half-wave plate unit 244 and may be mounted close enough to one another that the expanded laser beam 222 is not visible between the beam expander 220 and the half-wave plate 224.

The expanded laser beam 222 then passes through a polarizing beam splitter (e.g., polarizing cube beam splitter (PCBS) 228). The PCBS 228 is made of two triangular prisms that are attached to one another at their base. The interface between the triangular prisms is adapted to pass half of the expanded laser beam 222 through the interface and reflect the other half of the expanded laser beam 222. As a result, the PCBS 228 outputs two orthogonal, linearly polarized laser beams 230, 232 which are orthogonal polarization components of the expanded laser beam 222.

Orthogonal laser beam 232 is directed into a lens 234, which focuses the orthogonal laser beam 232 onto a substrate 206 to make a trench in the substrate 206. In one implementation, focused laser beam 202 has a cross-sectional diameter of equal or less than 2 μm at the substrate 206. Orthogonal laser beam 230 is reflected from mirror 236, which in some implementations is incorporated with the PCBS 228 as a compact unit, and passes through a second half-wave plate 238. In some implementations, one or more additional mirrors are implemented in the optics package 210 to package the laser source in close proximity to the optics package 210. The second half-wave plate 238 alters the overall polarization direction of orthogonal laser beam 230 to equal orthogonal laser beam 232. Orthogonal laser beam 230 is then directed into a lens 242, which focuses the orthogonal laser beam 230 onto the substrate 206 to make another trench in the substrate 206.

One or both lenses 234, 242 may be adjusted in the z-direction to achieve an equal or nearly equal cross-section diameter of the focused laser beams 202, 204 at the substrate 206. Z-direction adjustment may be manual or automatic depending on the implementation. Half-wave plate 224 may be adjusted to achieve an equal or nearly equal magnitude of the focused laser beams 202, 204 (discussed in more detail with regard to FIGS. 3A & 3B). Half-wave plate 238 may be adjusted to achieve an equal or nearly equal polarization direction of the focused laser beams 202, 204 (discussed in more detail with regard to FIGS. 3A & 3B). As a result, focused laser beams 202, 204 have an equal or nearly equal magnitude, cross-sectional diameter, and polarization direction at the substrate 206.

In one implementation, the optics package 210 is calibrated as follows to ensure that the focused laser beams 202, 204 are focused at desired locations and are of desired cross-section diameter at the substrate 206. The beam expander 220 may be both linearly moved in cardinal directions perpendicular to the laser beam 214 and rotated about cardinal axes perpendicular to the laser beam 214 to ensure that the laser beam 214 lines up with the beam expander 220. The half-wave plate 224 may be rotated about an axis coincident with laser beam 214 to achieve equal or nearly equal power and polarization direction of the focused laser beams 202, 204, as discussed in more detail below with reference to FIG. 3.

The PCBS 228 may be rotated about cardinal axes perpendicular to the laser beam 214 to place the orthogonal laser beam 230 at a desired location on the minor 236 and orthogonal laser beam 232 at a desired location on the substrate 206. The mirror 236 may also be rotated about cardinal axes perpendicular to the laser beam 214 to align the orthogonal beam 230 with the half-wave plate 238. The half-wave plate 238 may be rotated about an axis coincident with focused laser beam 204 to achieve equal or nearly equal power and polarization direction of the focused laser beams 202, 204, as discussed in more detail below with reference to FIG. 3.

Lenses 234, 242 may be rotated about cardinal axes perpendicular to focused laser beams 202, 204 to place focused laser beams 202, 204 accurately on the substrate 206. Further, lens 234 may also be moved in a direction coincident with the focused laser beam 202 to achieve an equal or nearly equal cross-section diameter of the focused laser beams 202, 204 at the substrate 206. In one implementation, the lens 234 has a 1 mm linear adjustment range with a 0.5 μm adjustment resolution.

Mirror 236, half-wave plate 238, and lens 242 may be moved as an assembly in a direction coincident with expanded laser beam 222 to achieve a desired spacing of the focused laser beams 202, 204 at the substrate 206. In one implementation, the mirror 236, half-wave plate 238, and lens 242 assembly has a 2 mm linear adjustment range with a 1 μm adjustment resolution. Further, lens 234 may also be linearly moved in a direction coincident with expanded laser beam 222 to achieve the desired spacing of the focused laser beams 202, 204 at the substrate 206.

In one implementation, the polarization direction of each of the focused laser beams 202, 204 is in the x-direction, which corresponds to making trenches also in the x-direction. The focused laser beams 202, 204 each make trenches on the substrate 206 by moving the substrate 206 in the x-direction as the optics package 210 periodically advances in the y-direction. The substrate 206 is rotated 90 degrees to make trenches orthogonal to the first trenches as described in detail with respect to FIG. 1.

A desired focused beam spot size may be calculated using an estimation of the diameter of the first minimum of the Airy diffraction pattern in the focal plane. An example equation defining the estimation is: $d = 2.44\ \lambda f/D$; where d is the estimated beam spot size diameter, $\lambda$ is the wavelength, f is the lens focal length, and D is the entry beam diameter. In one implementation, if $\lambda = 532$ nm, using a lens with $f = 22$ mm, the diffraction limited focusing spot diameter of a uniform 15 mm diameter beam is 1.9 μm. It is can be seen from the aforementioned equation that to reduce d, we can reduce $\lambda$ and/or f or increase D. Since $\lambda$ is defined by the laser source type, once the laser source is selected, the wavelength is fixed. As a result, only f and D are easily changed. In one implementation, a maximum D is selected to get longest f under the condition of achieving required spot size d.

Figure 3B:
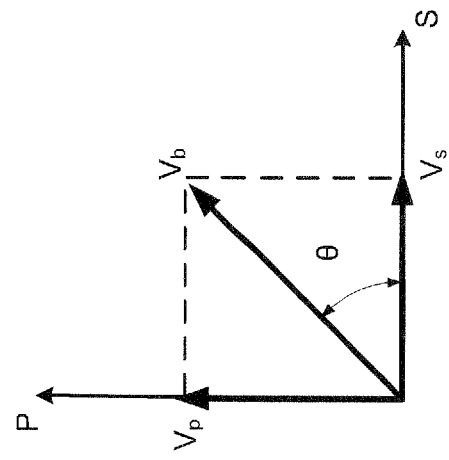
FIG. 3B illustrates example vector components of a laser beam within an optics package for a split laser scribe.
Figure 3A:
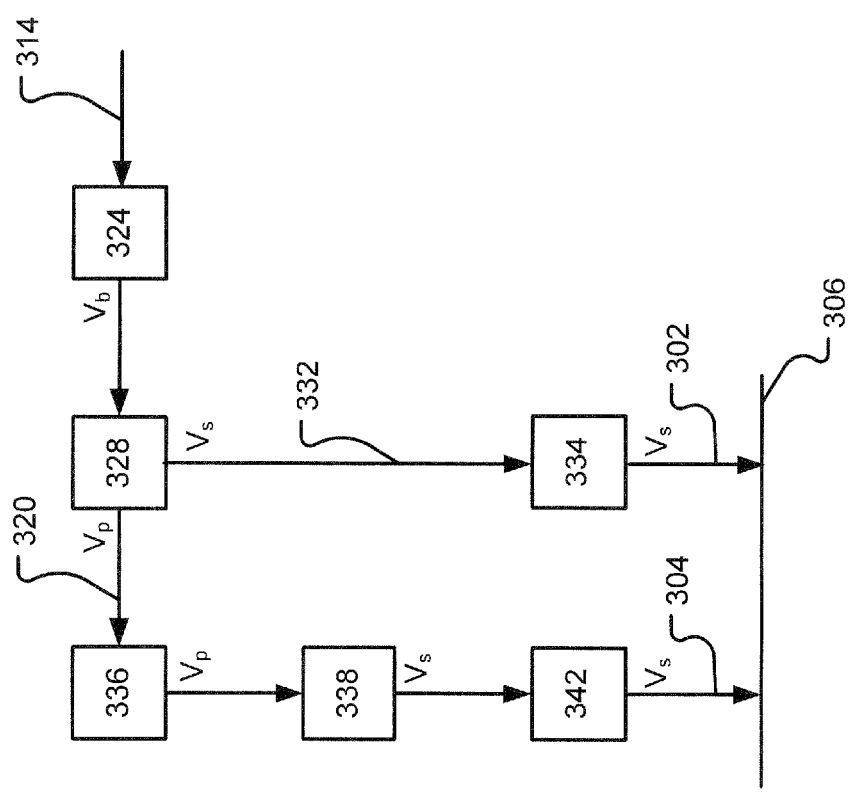
FIG. 3A illustrates an example laser beam split into two components with equal power, cross-sectional diameter, and polarization direction.

FIG. 3A illustrates an example laser beam 314 split into two components 302, 304 with equal magnitude, cross-sectional diameter, and polarization direction. Laser beam 314 enters a half-wave plate 324. The half-wave plate 324 is rotated such that the polarization of the beam 314 is $V_b$ (see FIG. 3B).

FIG. 3B illustrates example vectors ($V_b$, $V_p$, and $V_s$) of a laser beam within an optics package for a split laser scribe. In one implementation, $\theta$ is approximately equal to 45 degrees so that vector polarization components $V_p$ and $V_s$ are equal or nearly equal. However, $\theta$ is often not exactly equal to 45 degrees to compensate for unequal power losses in component laser beams 302, 304 as they are manipulated and transmitted to substrate 306.

Laser beam 314 with polarization direction $V_b$ is output from the half-wave plate 324 and input into PCBS 328. The PCBS 328 separates $V_p$ and $V_s$ components of $V_b$ and outputs a $V_p$ linearly polarized beam 320 and a $V_s$ linearly polarized beam 332. The ratio of the $V_p$ and $V_s$ components of $V_b$ are a function of $\theta$, which is adjusted by rotating the half-wave plate 324. As a result, the intensity of the $V_p$ linearly polarized beam 320 and a $V_s$ linearly polarized beam 332 output from the PCBS 328 and ultimately applied to a substrate 306 can be adjusted and balanced using the half-wave plate 324.

$V_p$ linearly polarized beam 320 is reflected off of mirror 336 and input into half-wave plate 338. Half-wave plate 338 alters the polarization direction of $V_p$ linearly polarized beam 320 to equal $V_s$ linearly polarized beam 332. Both $V_s$ linearly polarized beams are focused using lenses 334, 342 and output onto the substrate 306.

In one implementation, rotation of the half-wave plates 324, 338 to achieve equal or nearly equal power and polarization direction of the focused laser beams 302, 304 may be manual during commissioning of the optics package and/or or adjusted periodically by a technician. In another implementation, power and polarization direction is monitored by electronic equipment and rotation of the half-wave plates 324, 338 may be performed manually or automatically to achieve and/or maintain a desired tolerance of power and polarization direction between laser beams 302, 304.

Figure 4:
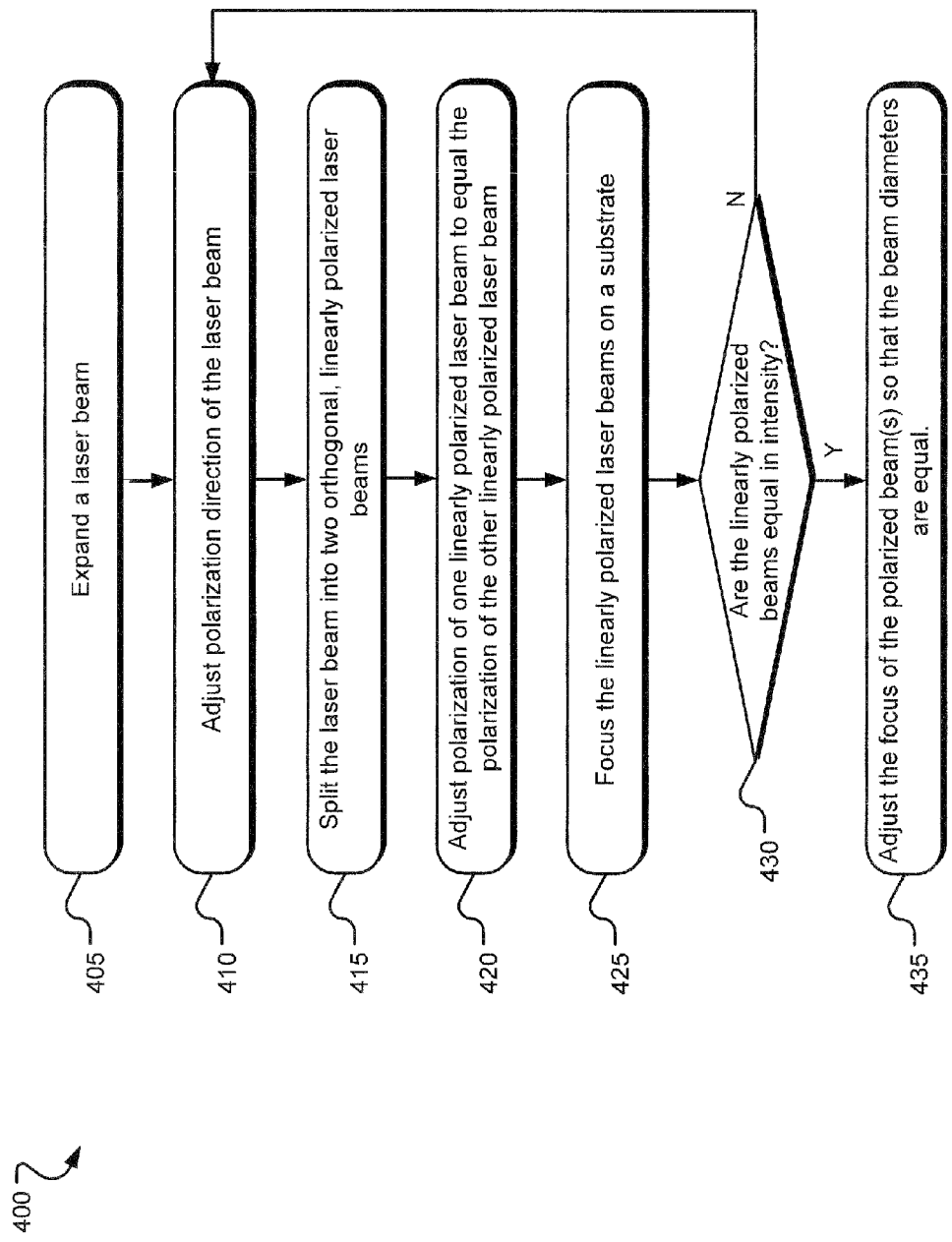
FIG. 4 illustrates example operations for obtaining two identical laser beams from a single laser beam according to the presently disclosed technology.

FIG. 4 illustrates example operations 400 for obtaining two identical laser beams from a single laser beam according to the presently disclosed technology. In an expanding operation 405, the diameter of a laser beam output from a laser source is expanded to a desired size. In an adjustment operation 410, the polarization direction of the laser beam is adjusted so that orthogonal components of the laser beam are equal or nearly equal in intensity. In a splitting operation 415, the laser beam is split into equal or nearly equal orthogonal, linearly polarized components.

In an adjustment operation 420, the polarization director of one of the orthogonal, linearly polarized component laser beams is adjusted to equal the polarization director of the other orthogonal, linearly polarized component laser beam. In a focusing operation 425, the linearly polarized laser beams are focused on a substrate. At decision operation 430, if the intensity of the linearly polarized laser beams is not equal or nearly equal within acceptable margins at the substrate, the operations 400 are repeated starting at the adjustment operation 410. If the intensity of the linearly polarized laser beams are equal or nearly equal within an acceptable tolerance at the substrate, the operations 400 continue to adjustment operation 435. In adjustment operation 435, the focus of one or both of the linearly polarized laser beams is adjusted so that the cross-sectional beam diameter at the substrate of both laser beams is equal or nearly equal within an acceptable tolerance.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of splitting a laser beam into two or more component laser beams, the method comprising:
adjusting a polarization direction of the laser beam using a half wave plate to yield two or more component polarization directions that are approximately equal in intensity;
splitting the laser beam into the two or more component laser beams, each having a polarization direction;
adjusting a component polarization direction of one of the two or more component laser beams to approximately equal the polarization direction of another of the two or more component laser beams; and
directing each of the two or more component laser beams into a different lens.

2. The method of claim 1, further comprising:
outputting the two or more component laser beams to a substrate; and
scribing two or more trenches in the substrate in a linear direction using the two or more component laser beams.

3. The method of claim 2, wherein the adjusted component polarization direction is approximately equal to the linear direction of the two or more trenches.

4. The method of claim 1, wherein the laser beam has a minimum power rating of class III/a.

5. The method of claim 1, further comprising:
expanding a diameter of the laser beam prior to adjusting the polarization direction of the laser beam.

6. The method of claim 1, further comprising:
reflecting one of the two or more of the component laser beams so that a linear direction of the reflected component laser beam approximately equals a linear direction of another of the two or more component laser beams.

7. The method of claim 2, further comprising:
focusing the two or more component laser beams on the substrate, wherein each different lens is oriented in a path of one of the two or more component laser beams.

8. The method of claim 7, further comprising:
adjusting a focused cross-sectional diameter at the substrate of one of the two or more component laser beams independent from another of the two or more component laser beams.

9. The method of claim 2, wherein an orthogonal spacing between two of the two or more component laser beams is approximately equal or less than half of a diameter of the substrate.

10. The method of claim 2, wherein the substrate is a sapphire substrate.

11. The method of claim 2, wherein the substrate includes epitaxial layers for producing LED light.

12. The method of claim 1, wherein the laser beam has a wavelength ranging from 200 nm to 600 nm.

13. The method of claim 1, wherein the two or more component laser beams are focused to a cross sectional diameter of less than 2 µm.

14. The method of claim 1, wherein the laser beam has a power level ranging from 5 µJ to 15 µJ.

15. A laser splitting apparatus, the apparatus comprising:
a laser source configured to output a laser beam;
a first half-wave plate configured to adjust a polarization direction of the laser beam to yield two or more component polarization directions that are approximately equal in intensity;
a polarizing beam splitter configured to split the laser beam into two or more component laser beams, each having a polarization direction; and
a second half-wave plate configured to adjust a component polarization direction of one of the two or more component laser beams to approximately equal the polarization direction of another of the two or more component laser beams; and
two or more lenses, each lens configured to receive a different laser beam of the two or more component laser beams.

16. The laser splitting apparatus of claim 15, wherein the first half-wave plate is configured to be rotated to adjust the polarization direction of the laser beam.

17. The laser splitting apparatus of claim 15, wherein the second half-wave plate is configured to be rotated to adjust the component polarization direction of one of the two or more component laser beams.

18. The laser splitting apparatus of claim 15, wherein the laser source has a minimum power rating of class III/a.

19. The laser splitting apparatus of claim 15, further comprising:
a beam expander configured to expand a diameter of the laser beam output from the laser source.

20. The laser splitting apparatus of claim 15, further comprising:
a mirror configured to reflect one of the two or more component laser beams so that a linear direction of the reflected component laser beam approximately equals a linear direction of another of the two or more component laser beams.

21. The laser splitting apparatus of claim 15, wherein each of the two or more lenses is configured to focus only one of the two or more component laser beams on a substrate.

22. The laser splitting apparatus of claim 21, wherein an orthogonal spacing between two of the two or more component laser beams is approximately equal or less than half of a diameter of the substrate.

23. The laser splitting apparatus of claim 21, wherein one of the two or more lenses is configured to be moved in a direction coincident with at least one of the two or more component laser beams so that at least two of the two or more component laser beams have approximately equal cross-sectional diameters at the substrate.

24. The laser splitting apparatus of claim 21, wherein the substrate is a sapphire substrate.

25. The laser splitting apparatus of claim 21, wherein the substrate includes epitaxial layers for producing LED light.

26. The laser splitting apparatus of claim 15, wherein the laser beam has a wavelength ranging from 200 nm to 600 nm.

27. The laser splitting apparatus of claim 15, wherein the two or more component laser beams are focused to a cross sectional diameter of less than 2 μm.

28. The laser splitting apparatus of claim 15, wherein the laser beam has a power level ranging from 5 μJ to 15 μJ.

29. A method of separating a die from a substrate, the method comprising:
adjusting a polarization direction of a laser beam using a half wave plate to yield two or more component polarization directions that are approximately equal in intensity;
splitting the laser beam into the two or more component laser beams, each having a polarization direction; and
adjusting a component polarization direction of one of the two or more component laser beams to approximately equal the polarization direction of another of the two or more component laser beams;
focusing each of the two or more component laser beams on the substrate using a different lens;
scribing at least two trenches in the substrate, thereby defining the die using the two or more component laser beams; and
breaking the substrate along the trenches.

30. The method of claim 29, further comprising:
rotating the substrate approximately 90 degrees; and
scribing two or more additional trenches in the substrate using the two or more component laser beams.

31. The method of claim 29, wherein the substrate is a sapphire substrate.

32. The method of claim 29, wherein the substrate includes epitaxial layers for producing LED light.

33. The method of claim 29, wherein the laser beam has a wavelength ranging from 200 nm to 600 nm.

34. The method of claim 29, wherein the two or more component laser beams are focused to a cross sectional diameter of less than 2 μm.

35. The method of claim 29, wherein the laser beam has a power level ranging from 5 μJ to 15 μJ.

* * * * *